Oct. 3, 1967    G. F. WIEGER    3,344,892
AUTOMATIC ADJUSTER
Filed April 19, 1965    3 Sheets-Sheet 2
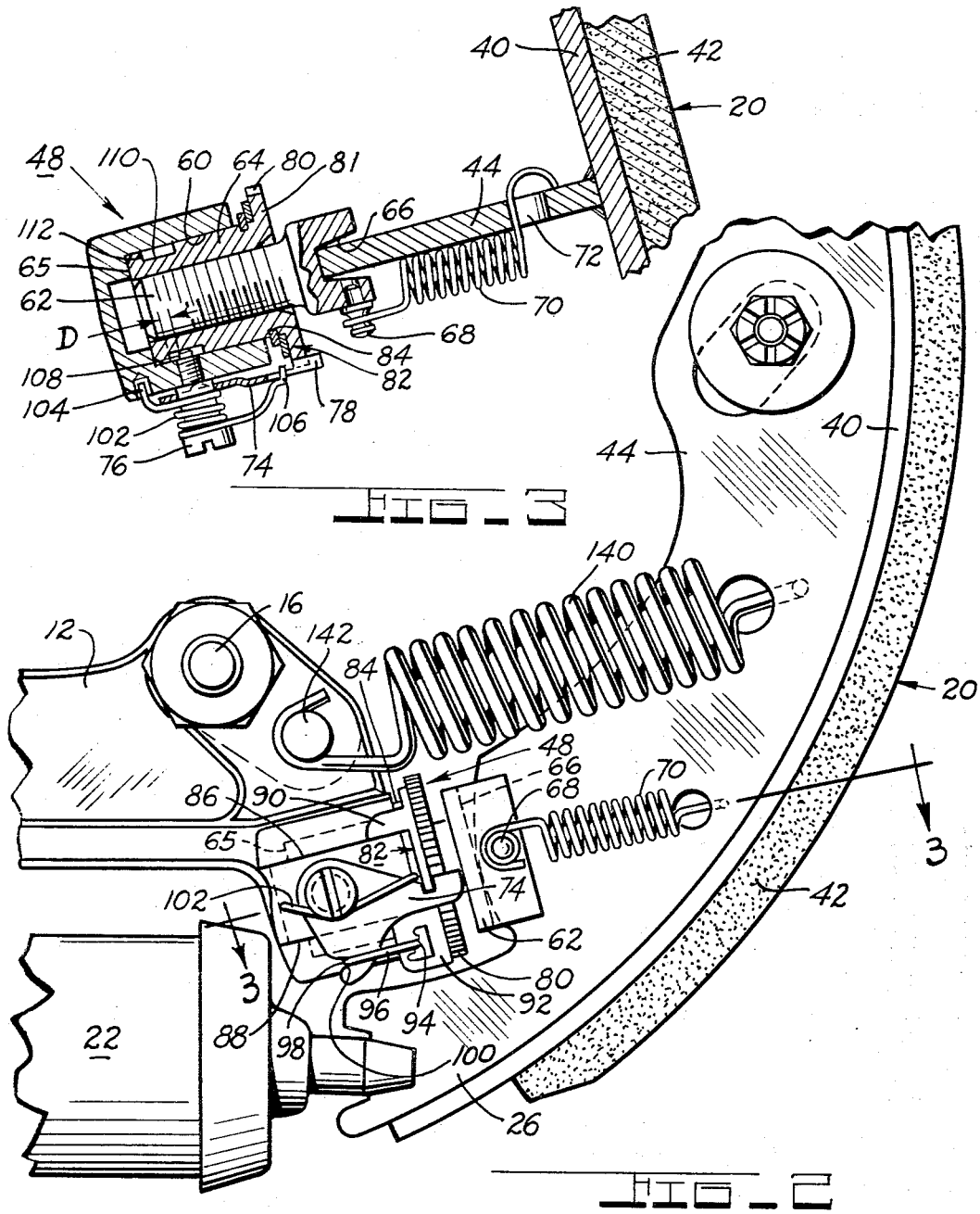
INVENTOR.
GEORGE F. WIEGER.
BY
*Sheldon F. Rojes*
ATTORNEY

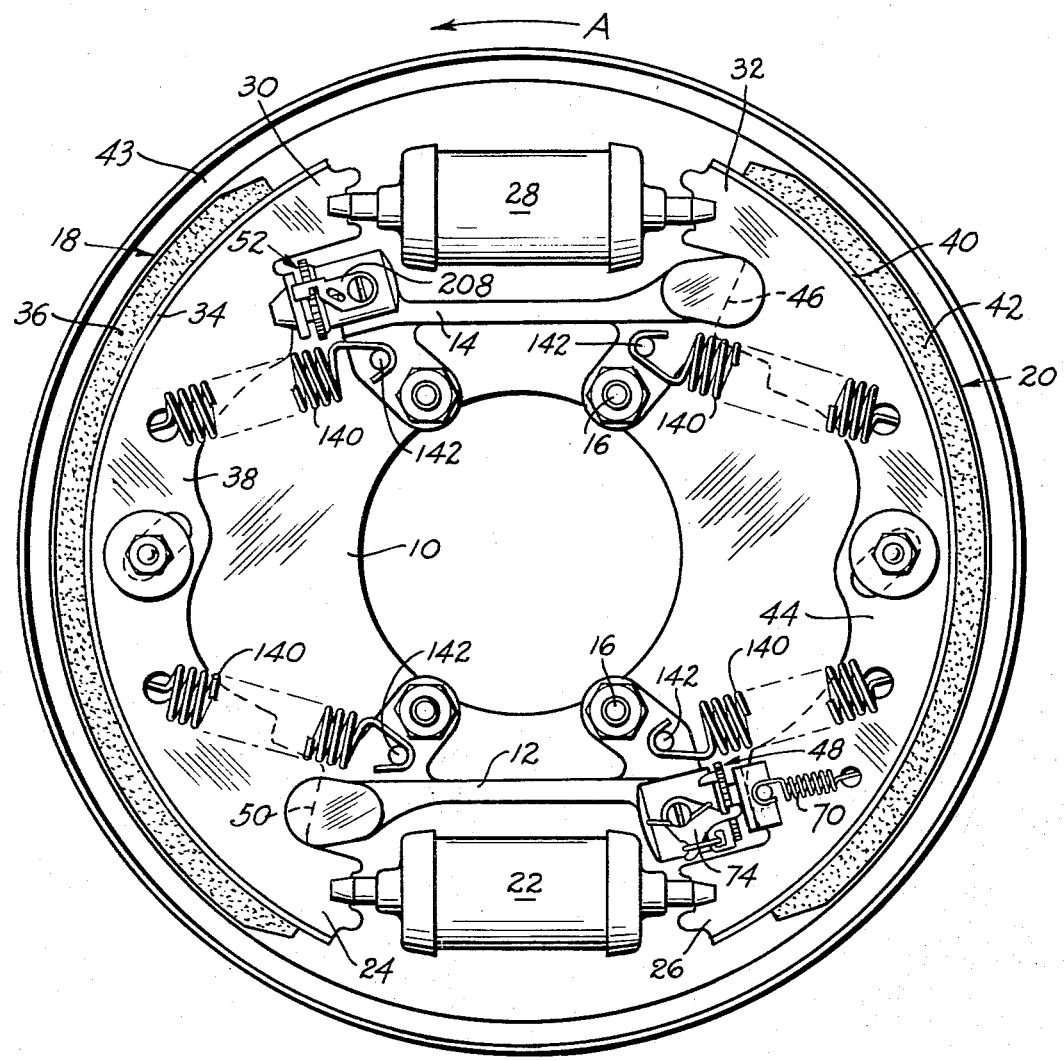
FIG_1

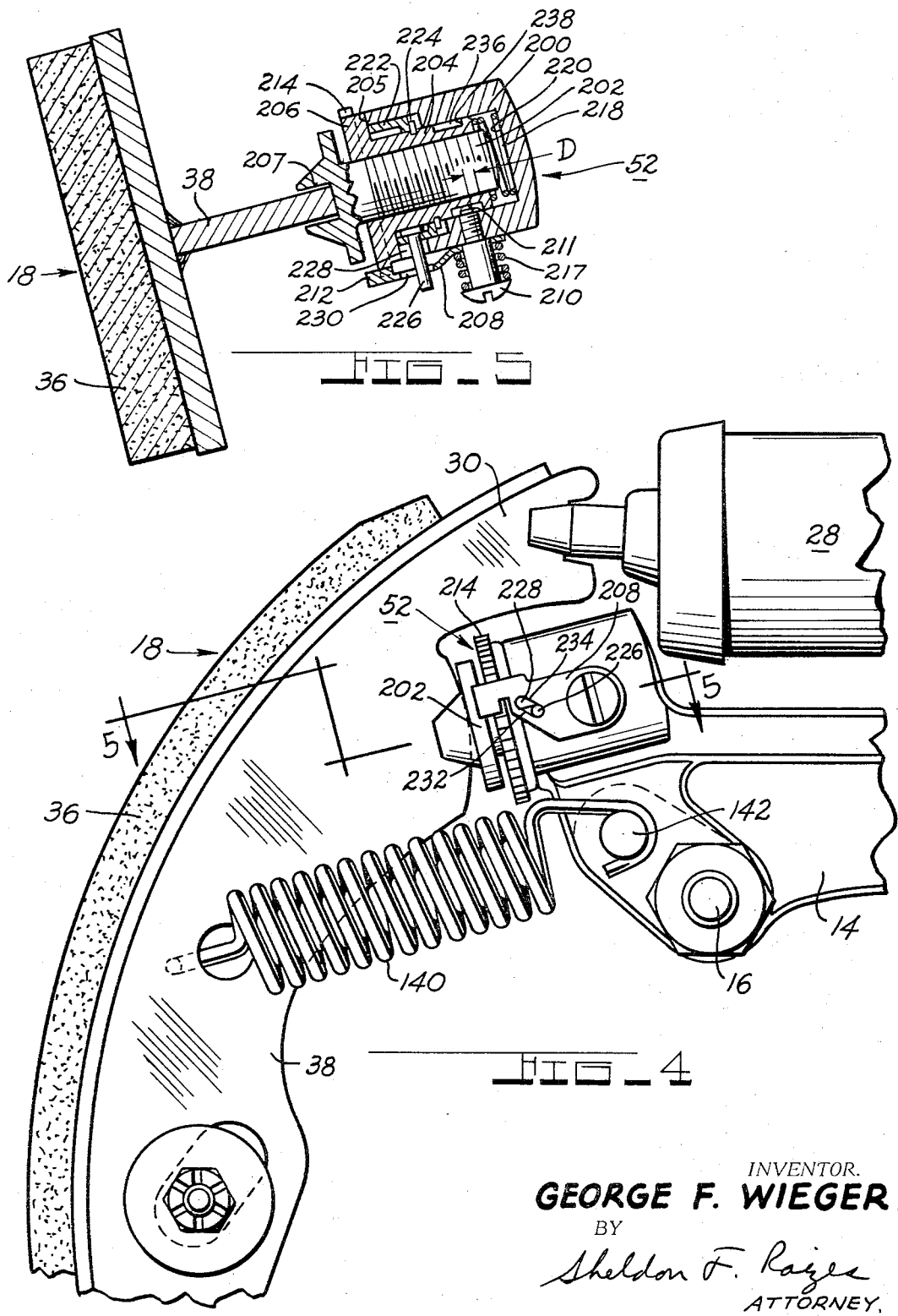

United States Patent Office 3,344,892
Patented Oct. 3, 1967

3,344,892
AUTOMATIC ADJUSTER
George F. Wieger, South Bend, Ind., assignor to The Bendix Corporation, South Bend, Ind.
Filed Apr. 19, 1965, Ser. No. 449,230
15 Claims. (Cl. 188—79.5)

ABSTRACT OF THE DISCLOSURE

A drum brake automatic adjuster having a brake shoe position responsive adjuster mechanism provided with a lost motion connection to the brake shoe positioned thereby to compensate for brake lining wear and maintain a running clearance between the brake lining and drum engageable therewith regardless of brake drum distortion.

An object of this invention is to provide a drum brake with an automatic adjuster which is compact, simple and reliable for adjusting the retracted position of the brake shoes of a brake assembly.

Another object of this invention is to provide an adjuster for a brake assembly, the design of which renders the use of a linkage type adjuster therefor very difficult.

Other objects of the invention will become apparent from the following description with reference to the drawings wherein:

FIGURE 1 is a front elevational view of a brake assembly;

FIGURE 2 is an enlarged view of the lower right-hand portion of the brake assembly;

FIGURE 3 is a view taken along section line 3—3 of FIGURE 2;

FIGURE 4 is an enlarged view of the upper left-hand portion of the brake assembly; and FIGURE 5 is a view taken along section line 5—5 of FIGURE 4.

Referring to FIGURE 1, a two-leading shoe brake is illustrated thereby. A backing plate 10 and a pair of anchor brackets 12, 14 are provided and are fastened to a stationary part of a vehicle, as for instance, an axle flange, by bolts 16 which extend through openings in the anchor bracket and the backing plate. A pair of brake shoes 18, 20 is slidably mounted on the backing plate 10 and a fluid actuator 22 is interposed between one pair of adjacent ends 24, 26 of the brake shoes 18, and 20, respectively, and a fluid actuator 28 is interposed between the other adjacent ends 30, 32 of the brake shoes 18, 20, respectively. The shoe 18 comprises a rim 34, friction lining 36 secured to the outer surface of the rim 34 and a transverse web 38 secured to the rim 34. The shoe 20 comprises a rim 40, a friction lining 42 secured to the outer surface of the rim 40 and a transverse web 44 secured to the rim 40. A rotatable drum 43 is connected to a wheel (not shown) and is adapted to be engaged by the linings 36 and 42 for braking the wheel. The portion of the web at one end 32 of the shoe 20 is adapted to engage an anchoring surface 46 on the anchoring bracket 14, and the portion of the web at the opposite end 26 of the shoe is adapted to engage an adjustable assembly 48 carried by the anchoring bracket 12. The portion of the web 38 at one end 24 of the shoe 18 is adapted to engage an anchoring surface 50 on the anchoring bracket 12, and the portion of the web 38 at the opposite end 30 of the brake shoe 18 is adapted to engage an adjustable assembly 52 carried by the anchoring bracket 14.

Two embodiments of adjusters are shown on the same brake assembly for illustration purposes in order to avoid additional figures. The adjustable assembly 48 designates one type of adjustable assembly, while the adjustable assembly 52 is a modified form of the adjuster assembly 48.

Referring to FIGURES 2 and 3, the anchoring bracket 12 includes a bore 60 which slidably receives the adjustable assembly 48 therein. The adjustable assembly comprises an externally threaded adjusting screw 62 and an internally threaded adjuster nut 64 threadedly receiving the adjusting screw 62 therein. A shoulder 65 is provided at the end of the bore 60 for anchoring engagement by the end of the adjuster nut 64. The adjusting screw 62 has a slot 66 which receives a portion of the web 44 therein and has a pin 68 secured thereto. A spring 70 is hooked at one end onto the pin 68 and has its other end extending through an opening 72 in the web 44 for securing the same thereto.

A pawl 74 is pivotally mounted on the anchoring bracket 12 by a stud 76 threadedly secured to the bracket 12. A finger 78 is carried by the pawl 74 and extends into driving engagement with one of a plurality of teeth 80 located on the outer periphery of a flange 81 on the adjusting nut 64. An annular stamping 82 is carried by the adjuster nut 64 and is secured thereto by a snap ring 84. A pair of ridges 86 and 88 is provided on the anchoring bracket 12. A detent 90 extending from the stamping 82 engages the ridge 86 and an eyelet 92, also extending from the stamping 82, engages the ridge 88 thereby preventing rotation of the stamping. Thus, the stamping 82 reciprocates in an axial direction of the bore 60 with the adjuster nut 64 but does not rotate therewith. One end 94 of a link 96 is hooked onto the eyelet 92 and the other end 98 of the link 96 is hooked onto a recessed edge 100 of the pawl 74 for interconnecting the pawl 74 with the stamping 82 and thereby the adjuster nut 64. The edge 100 on the pawl 74 is always urged clockwise into engagement with the end 98 of link 96 by a torsion spring 102 which is wrapped around the stud 76 and anchored at one end 104 to the anchoring bracket 12 and engages the pawl 74 at its other end 106. The finger 78 and teeth 80 are arranged relative to each other so that the nut 64 will be rotated upon counterclockwise pivoting of the pawl 74. Rotation of the nut 64 effects extension of the adjuster screw 62 outwards to adjust the brake released position of the shoe 20. The spring 102 also acts to urge the pawl 74 axially of the stud 76 to maintain the finger 78 in engagement with the teeth 80 and to allow the finger 78 to ride over the teeth to pick up another tooth. The inner end 108 of the stud 76 projects into an annuar groove 110 on the adjuster nut 64 and serves as a stop for limiting outward movement of the adjuster nut 64 (a distance D) whereupon a shoulder 112 of the groove 110 engages the end 108 of the stud 76.

Referring to the adjuster 52, the anchoring bracket 14 includes a bore 200 which slidably receives the adjuster assembly 52 therein. The adjuster assembly 52 comprises an externally threaded adjusting screw 202 threadedly received within an adjuster nut 204. An annular surface 205 is provided on the bracket 14 and a flange 206 is provided on the adjuster nut 204 which is adapted to anchor on the surface 205. The adjuster screw 202 has a slot 207 receiving a portion of the web 38 therein. A pawl 208 is pivotally secured to the anchoring bracket 14 by a stud 210 and has a finger 212 extending in driving relationship with one of a plurality of teeth 214 located on the flange 206 of the adjuster nut 204. A spring 217 urges the pawl 208 axially of the stud 210 to maintain the finger 212 in engagement with the teeth 214 and allows the finger 212 to ride over the teeth to pick up another tooth. A spring 218 is compressed between the end wall 220 of the bore 200 and the adjuster nut 204 urging the adjuster nut and the screw axially outwards of the bore. A ring 222 is secured to the adjuster nut 204 by a snap ring 224 and thereby secures a pin 226 to the adjuster nut 204 for axial reciprocable movement therewith. The pin 226 extends through a slot 228 on the anchoring bracket which prevents rotation of the pin 226, and also extends through a slot 230 in the pawl 208. The slot 230 comprises two camming edges 232, 234 which are engaged by the pin 226 during reciprocable movement of the pin. The stud 210 includes an end 211 extending into the bore 200 and into an annular groove 236 on the outer surface of the adjusting screw nut 204 and acts as a stop to limit outward movement of the adjuster nut 204 a distance D whereupon a shoulder 238 of the groove 236 engages the stud. The pin 226 and cam surfaces 232, 234 are arranged relative to each other that upon outward axial movement of the pin, the pawl 208 will be pivoted counterclockwise by the pin 226 through engagement with cam surface 232 and upon movement of the pin 226 in the opposite direction the pawl will be moved in a clockwise direction by the pin 226 through engagement with cam surface 234. The finger 212 and teeth 214 are arranged relative to each other so that the nut 204 will be rotated upon counterclockwise pivoting of pawl 208. Rotation of the nut 204 effects extension of the adjuster screw 202 outwards to adjust the brake released position of the shoe 18. The engagement of the web 44 with the anchoring surface 26, the adjustable assembly 48 with anchoring shoulder 65, the web 38 with the anchoring surface 50, and the adjustable assembly 52 with the anchoring surface 205 defines the retracted position of the brake shoes 20 and 18, respectively. Each of a plurality of shoe return springs 140 is secured at one end to a respective shoe and at the other end to a post 142, which is secured to a respective anchoring bracket to urge the shoes into their brake released positions. The shoe return spring 140 associated with the adjuster 52 is stronger than spring 218 and compresses the same during brake released position.

*Operation*

In operation, assuming rotation of the drum 43 in the direction of Arrow A, upon hydraulic pressure being applied to the fluid motors 22 and 28, the shoes 18, 20 will be spread into engagement with the drum 43 with the shoe 20 anchoring at end 32 on the anchoring surface 46 of the anchoring bracket 14, and the shoe 18 anchoring at its end 24 on the anchoring surface 50 of the anchoring bracket 12. Looking first at the adjuster assembly 48, the shoe 20, through the spring connection 70 to the adjuster screw 62, pulls the adjuster screw 62 and adjuster nut 64 outwards from the bore 60 whereby the link 96 pivots the pawl 74 in a counterclockwise direction to rotate the adjuster nut 64 and thereby extend the adjuster screw 62 outwards relative to the adjuster nut 64. When the shoe 20 is applied, the adjuster nut 64 and screw 62 are pulled axially outwards a distance D before the shoulder 112 engages the stop 108 by the shoe 20 and any further shoe movement for brake application will be permitted due to stretching of the spring 70 which allows relative movement between the shoe 20 and the adjuster screw 62. Therefore, adjustment will be effected for shoe movement traveling a distance D and any further travel by the shoe, due to the drum distortion, will not effect the adjustment. If the adjuster assembly were allowed to follow the shoe throughout its entire movement, then the adjuster would over-adjust, resulting in dragging of the lining or locking of the brakes. Upon release of the brake, the shoe return springs 140 will force the shoe 20 back to its released position thereby retracting the adjusting screw nut 62 and the adjuster screw nut 64 until the adjuster screw nut 64 engages shoulder 65. Upon retraction of the adjuster assembly, the torsion spring 102 will pivot the pawl 74 in a clockwise direction whereby the pawl may pick up a different tooth 80 when the lining 42 has worn a predetermined amount. It will be understood that the distance D is the sum of a desired predetermined running clearance to be maintained between the lining 42 of shoe 20 in its retracted position and the drum 43 and a predetermined distance related to the degree of lining wear to be compensated for per adjustment of adjuster nut 64. Thus the spacing of teeth 80 is selected accordingly to permit pawl 74 to move without engaging a tooth 80 to thereby avoid movement of adjuster nut 64 until the necessary degree of lining wear is attained.

Referring now to the operation of the adjuster 52, the spring 218 pushes the adjuster assembly outwardly to follow movement of the shoe 18. As the adjuster assembly moves outwards, the pin 226 engages the camming edge 232 to pivot the pawl 208 in a counterclockwise direction thereby rotating the adjuster nut 204. Upon return of the shoe 18 by the return spring 140, the return spring 140 retracts the adjuster assembly through the shoe 18 and upon retraction, the pin 226 acts on camming edge 234 to pivot the pawl in a clockwise direction to enable the pawl to pickup another tooth if the lining has worn sufficiently. As in the previous embodiment, the adjuster assembly is limited in it outward movement by the stop 211 to prevent over-adjustment from shoe movement to accommodate drum distortion.

Some of the features of one embodiment might be substituted for the features performing a similar function on the other embodiment. For instance, the spring connection between the adjuster screw and the brake shoe 20 for the adjuster assembly 48 could be utilized for interconnecting the shoe 18 and the adjusting screw 202 with the spring 218 being eliminated. Furthermore, the disclosed connections between the adjuster nut and the pawl for pivoting the same could be utilized in either embodiment.

While the adjusters have been described as adjusting during brake application, they could easily be modified to adjust upon brake release. Referring to the adjuster 52, the slot 230 in the pawl 208 could be inclined in the opposite direction whereby the pivoting action of the pawl would be in a clockwise direction upon outward movement of the adjustment assembly and pivoting movement of the pawl would be in a counterclockwise direction upon retraction of the adjuster assembly. Referring to the adjuster 48, the pawl and teeth could be arranged that the pawl would pivot the adjuster nut upon clockwise pivotal movement thereof instead of counterclockwise pivotal movement thereof. In this instance, the torsion spring 102 would have to be designed of such strength to rotate the adjuster nut 64 upon brake release.

Although a few embodiments of the invention have been described in considerable detail, numerous modifications of the invention will occur to those skilled in the art. I therefore intend to include within the scope of the following claims all equivalent devices which are similar in structure and function in substantially the same manner as that described.

I claim:

1. In a brake: a rotatable drum, a slidable brake shoe, a stationary member having a bore therein, an adjustable assembly slidably mounted for reciprocable movement in said bore, said adjustable assembly comprising a non-rotatable member and a rotatable member threadedly connected to said non-rotatable member, actuating means separate from said adjustable assembly operably connected to said shoe for thrusting the same outwardly into engagement with said drum, means effecting outward movement of said adjustable assembly simultaneously with outward movement of said shoe, means for retracting said adjustable assembly, a pawl pivotally mounted on said stationary member, a plurality of teeth carried by said rotatable member and drivingly engaged by said pawl for rotating said rotatable member upon pivotal movement thereof in one direction, means operably connecting said pawl to said adjustable assembly for pivoting the same in said one direction upon slidable movement of said adjustable assembly in one direction, and means for pivoting said pawl in the opposite direction upon slidable movement of said adjustable assembly in the opposite direction.

2. The structure is recited in claim 1, wherein said means effecting outward movement of said adustable assembly simultaneously with outward movement of said shoe comprises spring means acting on said adjustable assembly and reacting on said housing urging said adjustable assembly outward and into engagement with said shoe, said means for retracting said adjustable assembly comprising return spring means acting on said shoe and thereby on said adjustable assembly, said return spring means being stronger than said first named spring means.

3. The structure as recited in claim 2, wherein said pawl is pivoted in said one direction to rotate said rotatable member upon slidable outwards movement of said adjustable assembly.

4. The structure as recited in claim 1, wherein said means for pivoting said lever in said one direction and in said opposite direction comprises a pin connected to said adjustable assembly to reciprocate therewith and a pair of camming surfaces carried by said pawl, said camming surface and pin being arranged that said pin will engage one of said camming surfaces to pivot said pawl in said one direction and will engage the other of said camming surfaces to pivot said pawl in said opposite direction.

5. In a brake; a rotatable drum, a slidable brake shoe, a stationary housing member having a bore therein, an adjustable assembly slidably mounted for reciprocable movement in said bore, said adjustable assembly comprising an inner non-rotatable member and an outer rotatable sleeve threadedly connected to said non-rotatable member, said inner member engaging said shoe, actuating means separate from said adjustable assembly operably connected to said shoe for thrusting the same outwardly into engagement with said drum, means effecting outward movement of said adjustable assembly simultaneously with outward movement of said shoe, stop means limiting outward movement of said adjustable assembly, means for retracting said adjustable assembly, a pawl pivotally mounted on said stationary member, a plurality of teeth carried by said rotatable sleeve and drivingly engaged by said pawl for rotating said rotatable sleeve upon pivotal movement thereof in one direction, means operably connecting said pawl to said adjustable assembly for pivoting the same in said one direction upon slidable movement of said adjustable assembly in one direction, and means for pivoting said pawl in the opposite direction upon slidable movement of said adjustable assembly in the opposite direction.

6. The structure as recited in claim 5, wherein said means effecting outward movement of said adjustable assembly simultaneously with outward movement of said shoe comprises spring means acting on said sleeve and reacting on said housing urging said non-rotatable member and said sleeve outwards into engagement with said shoe, said means for retracting said adjustable assembly comprising return spring means acting on said shoe and thereby on said non-rotatable member, said return spring means being stronger than said first named spring means.

7. The structure as recited in claim 6, wherein said pawl is pivoted in said one direction to rotate said rotatable sleeve upon slidable outwards movement of said adjustable assembly.

8. The structure as recited in claim 5, wherein said means for pivoting said lever in said one direction and in said opposite direction comprises a pin connected to said adjustable assembly to reciprocate therewith and a pair of camming surfaces carried by said pawl, said camming surfaces and pin being arranged that said pin will engage one of said camming surfaces to pivot said pawl in said one direction and will engage the other of said camming surfaces to pivot said pawl in said opposite direction.

9. In a brake: a rotatable drum, a slidable brake shoe, a stationary member having a bore therein, an adjustable assembly slidably mounted for reciprocable movement in said bore, said adjustable assembly comprising a non-rotatable member and a rotatable member threadedly connected to said non-rotatable member, actuating means separate from said adjustable assembly operably connected to said shoe for thrusting the same outwardly into engagement with said drum, means operably connecting said adjustable assembly to said shoe for outward movement therewith, means for retracting said adjustable assembly, a pawl pivotally mounted on said stationary member, a plurality of teeth carried by said rotatable member and drivingly engaged by said pawl for rotating said rotatable member upon pivotal movement thereof in one direction, means operably connecting said pawl to said adustable assembly for pivoting the same in said one direction upon slidable movement of said adjustable assembly in one direction, and means for pivoting said pawl in the opposite direction upon slidable movement of said adjustable assembly in the opposite direction.

10. In a brake: a rotatable drum, a slidable brake shoe, a stationary housing member having a bore therein, an adjustable assembly slidably mounted for reciprocal movement in said bore, said adjustable assembly comprising a non-rotatable member and a rotatable member threadedly connected to said non-rotatable member, actuating means separate from said adjustable assembly operably connected to said shoe for thrusting the same outwardly into engagement with said drum, resilient means operably connecting said adjustable assembly shoe to said shoe for outward movement therewith, stop means limiting outward movement of said adjustable assembly, means for retracting said adjustable assembly, a pawl pivotally mounted on said stationary member, a plurality of teeth carried by said rotatable member and drivingly engaged by said pawl for rotating said rotatable member upon pivotal movement thereof in one direction, means operably connecting said pawl to said adjustable assembly for pivoting the same in said one direction upon slidable movement of said adjustable assembly in one direction, and means for pivoting said pawl in the opposite direction upon slidable movement of said adjustable assembly in the opposite direction.

11. In a brake: a rotatable drum, a slidable brake shoe, a stationary member having a bore therein, an adjustable assembly slidably mounted for reciprocal movement in said bore, said adjustable assembly comprising a non-rotatable member and a rotatable member threadedly connected to said non-rotatable member, actuating means separate from said adjustable assembly operably connected to said shoe for thrusting the same outwardly into engagement with said drum, means operably connecting said shoe to said adjustable assembly for outward movement therewith, a pawl pivotally mounted on said stationary member, a plurality of teeth carried by said rotatable member and drivingly engaged by said pawl for rotating said rotatable member upon pivotal movement thereof in one direction, means operably connecting said pawl to said adjustable assembly for pivoting the same in said one direction upon outward movement of said adjustable assembly, means for retracting said adjustable assembly, and means for pivoting said pawl in the opposite direction upon retraction of said adjustable assembly.

12. In a brake: a rotatable drum, a slidable brake shoe, a stationary member having a bore therein, an adjustable assembly slidably mounted for reciprocable movement in said bore, said adjustable assembly comprising a non-rotatable member and a rotatable member threadedly connected to said non-rotatable member, actuating means separate from said adjustable assembly operably connected to said shoe for thrusting the same outwardly into engagement with said drum, resilient means operably connecting said adjustable assembly to said shoe for outward movement therewith, stop means limiting outward movement of said adjustable assembly, a pawl pivotally mounted on said stationary member, a plurality of teeth carried by said rotatable member and drivingly engaged by said pawl for rotating said rotatable member upon pivotal movement thereof in one direction, means operably connecting said pawl to said adjustable assembly for pivoting the same in said one direction upon outward movement of said adjustable assembly, means for retracting said adjustable assembly, and means for pivoting said pawl in the opposite direction upon retraction of said adjustable assembly.

13. In a brake: a rotatable drum, a slidable brake shoe, a stationary member having a bore therein, an adjustable assembly slidably mounted for reciprocable movement in said bore, said adjustable assembly comprising an inner non-rotatable member and an outer rotatable sleeve threadedly connected to said non-rotatable member, said non-rotatable member engaging said shoe, actuating means separate from said adjustable assembly operably connected to said shoe for thrusting the same outwardly into engagement with said drum, spring means connected at one end to said non-rotatable member and at the other end to said shoe effecting a connection therebetween for effecting outward movement of said adjustable assembly with said shoe, stop means arranged to be engaged by said sleeve for limiting outward movement of said adjustable assembly, return spring means acting on said shoe and thereby said non-rotatable member for retracting said adjustable assembly, a pawl pivotally mounted on said stationary member, a plurality of teeth carried by said rotatable sleeve and drivingly engaged by said pawl for rotating said rotatable sleeve upon pivotal movement thereof in one direction, means operably connecting said pawl to said rotatable sleeve for pivoting the same in said one direction upon slidable movement of said adjustable assembly in one direction, and means for pivoting said pawl in the opposite direction upon retraction of said adjustable assembly.

14. In a brake: a rotatable drum, a slidable brake shoe, a stationary member having a bore therein, an adjustable assembly slidably mounted for reciprocal movement in said bore, said adjustable assembly comprising an inner non-rotatable member and an outer rotatable sleeve threadedly connected to said non-rotatable member, said non-rotatable member engaging said shoe, actuating means separate from said adjustable assembly operably connected to said shoe for thrusting the same outwardly into engagement with said drum, spring means connected at one end to said non-rotatable member and at the other end to said shoe effecting a connection therebetween for effecting outward movement of said adjustable assembly with said shoe, stop means arranged to be engaged by said sleeve for limiting outward movement of said adjustable assembly, return spring means acting on said shoe and thereby said non-rotatable member for retracting said adjustable assembly, a pawl pivotally mounted on said stationary member, a plurality of teeth carried by said rotatable sleeve and drivingly engaged by said pawl for rotating said rotatable sleeve upon pivotal movement thereof in one direction, a link connecting said pawl to said rotatable sleeve for pivoting the same in said one direction upon outward slidable movement of said adjustable assembly, and spring means urging said pawl in the opposite pivotal direction in a thrust engagement with said link.

15. The structure as recited in claim 13, wherein said means for pivoting said lever in said one direction and in said opposite direction comprises a pin connected to said adjustable assembly to reciprocate therewith and a pair of camming surfaces carried by said pawl, said camming surfaces and pin being arranged that said pin will engage one of said camming surfaces to pivot said pawl in said one direction and will engage the other of said camming surfaces to pivot said pawl in said opposite direction.

References Cited
UNITED STATES PATENTS 2,389,618 11/1945 Goepfrich _____ 188—79.5
3,169,610 2/1965 Gold _____ 188—79.5

DUANE A. REGER, *Primary Examiner.*